(12) United States Patent
Kishikawa

(10) Patent No.: US 8,689,922 B2
(45) Date of Patent: Apr. 8, 2014

(54) VEHICLE BODY FRAME, SADDLE RIDING VEHICLE WITH THE SAME, AND METHOD FOR PRODUCING VEHICLE BODY FRAME

(75) Inventor: Keisuke Kishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/530,109

(22) Filed: Jun. 22, 2012

(65) Prior Publication Data

US 2013/0020781 A1   Jan. 24, 2013

(30) Foreign Application Priority Data

Jul. 19, 2011   (JP) .................................. 2011-157614

(51) Int. Cl.
  *B62D 61/02* (2006.01)
(52) U.S. Cl.
  USPC .......... 180/219; 280/281.1; 280/781; 180/311
(58) Field of Classification Search
  CPC ................................ B62K 11/02; B62K 19/20
  USPC ........................................................ 180/219
  See application file for complete search history.

(56) References Cited

U.S. PATENT DOCUMENTS

| 5,323,869 | A | * | 6/1994 | Kurayoshi et al. | ............ 180/219 |
| 6,746,031 | B2 | * | 6/2004 | Carlstedt | ............... 280/124.107 |
| 6,860,353 | B2 | * | 3/2005 | Miyashiro | ...................... 180/227 |
| 2005/0206117 | A1 | * | 9/2005 | Temmerman et al. | ........ 280/276 |
| 2007/0102913 | A1 | * | 5/2007 | Ramsey | ....................... 280/783 |

FOREIGN PATENT DOCUMENTS

JP     3534279 B2     3/2004
JP     2011148441 A  *  8/2011

* cited by examiner

*Primary Examiner* — Ruth Ilan
*Assistant Examiner* — Conan Duda
(74) *Attorney, Agent, or Firm* — Ditthavong Mori & Steiner, P.C.

(57) ABSTRACT

A vehicle body frame includes a left frame member, a right frame member, a cross member, and a first patch member. The cross member is fitted in both of a left connecting hole and a right connecting hole and welded to the left frame member and the right frame member. The cross member includes a pipe member having a hollow portion which has a first end, and a second end opposite to the first end along the hollow portion. The first patch member is fitted in the first end of the hollow portion and welded to an inner peripheral face of the hollow portion such that a weld bead is provided within a range of a first welding margin provided in the first end of the hollow portion. The first welding margin is provided on the inner peripheral face of the hollow portion.

13 Claims, 7 Drawing Sheets

VEHICLE BODY FRAME, SADDLE RIDING VEHICLE WITH THE SAME, AND METHOD FOR PRODUCING VEHICLE BODY FRAME

CROSS-REFERENCE TO RELATED APPLICATIONS

The present application claims priority under 35 U.S.C. §119 to Japanese Patent Application No. 2011-157614, filed Jul. 19, 2011. The contents of this application are incorporated herein by reference in their entirety.

BACKGROUND OF THE INVENTION

1. Field of the Invention

This invention relates to a vehicle body frame, a saddle riding vehicle with the vehicle body frame, and a method for producing the vehicle body frame.

2. Discussion of the Background

Such a vehicle body frame as described above in which the cross member is configured from a solid rod-like member is conventionally known (refer to Japanese Patent No. 3534279).

Incidentally, in such a vehicle body frame as described above, it is preferable to configure the cross member from a hollow pipe member in order to achieve weight saving of the vehicle body frame. However, by merely configuring the cross member from a hollow pipe member, the cross member sometimes lacks in rigidity. In order to reinforce the cross member, such a countermeasure as to dispose a disk-shaped patch member, which has a diameter equal to that of the cross member for closing up the hollow portion, in abutment with an end face of the cross member and weld the abutting portions to each other seems applicable.

SUMMARY OF THE INVENTION

According to one aspect of the present invention, a vehicle body frame includes a left frame member, a right frame member, a cross member, and a first patch member. The right frame member has a right connecting hole extending through the right frame member in a vehicle widthwise direction. The left frame member has a left connecting hole extending through the left frame member in the vehicle widthwise direction. The left frame member is spaced from the right frame member in the vehicle widthwise direction. The left connecting hole is disposed substantially coaxially with the right connecting hole. The cross member is fitted in both of the left connecting hole and the right connecting hole and welded to the left frame member and the right frame member. The cross member includes a pipe member having a hollow portion which has a first end, a second end opposite to the first end along the hollow portion, a first opening at the first end, and a second opening at the second end. The first patch member is fitted in the first end of the hollow portion and welded to an inner peripheral face of the hollow portion such that a weld bead is provided within a range of a first welding margin provided in the first end of the hollow portion. The first welding margin is provided on the inner peripheral face of the hollow portion.

According to another aspect of the present invention, a saddle riding vehicle includes a front fork, a front wheel, a rear fork, a rear wheel, the vehicle body frame, a suspension apparatus, and a rocking member. The front wheel is rotatably supported by the front fork. The rear wheel is rotatably supported by the rear fork. The vehicle body frame further includes a head pipe and a main frame. The head pipe supports the front fork in a rotatable manner. The main frame extends rearwardly from the head pipe. The left and right frame members extend downwardly from a rear portion of the main frame and support the rear fork in a rotatable manner for upward and downward rocking motion through a pivot shaft. The cross member is welded to the left and right frame members to connect the left frame member to the right frame member. The suspension apparatus is to damp upward and downward rocking motion of the rear fork and includes a cushion device. The rocking member supports a lower end portion of a cushion device and pivotally supported by the cross member.

According to further aspect of the present invention, a method for producing a vehicle body frame includes: preparing a cross member including a pipe member having a hollow portion which has a first end, a second end opposite to the first end along the hollow portion, a first opening at the first end, and a second opening at the second end; fitting a first patch member into the first end of the hollow portion of the cross member; welding the first patch member to an inner peripheral face of the hollow portion; fitting the cross member into a left connecting hole of a left frame member and a right connecting hole of a right frame member so that the first and second ends of the cross member respectively project outward from the left and right connecting holes; welding the first end of the cross member to an outer side face of the left frame member; and welding the second end of the cross member to an outer side face of the right frame member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
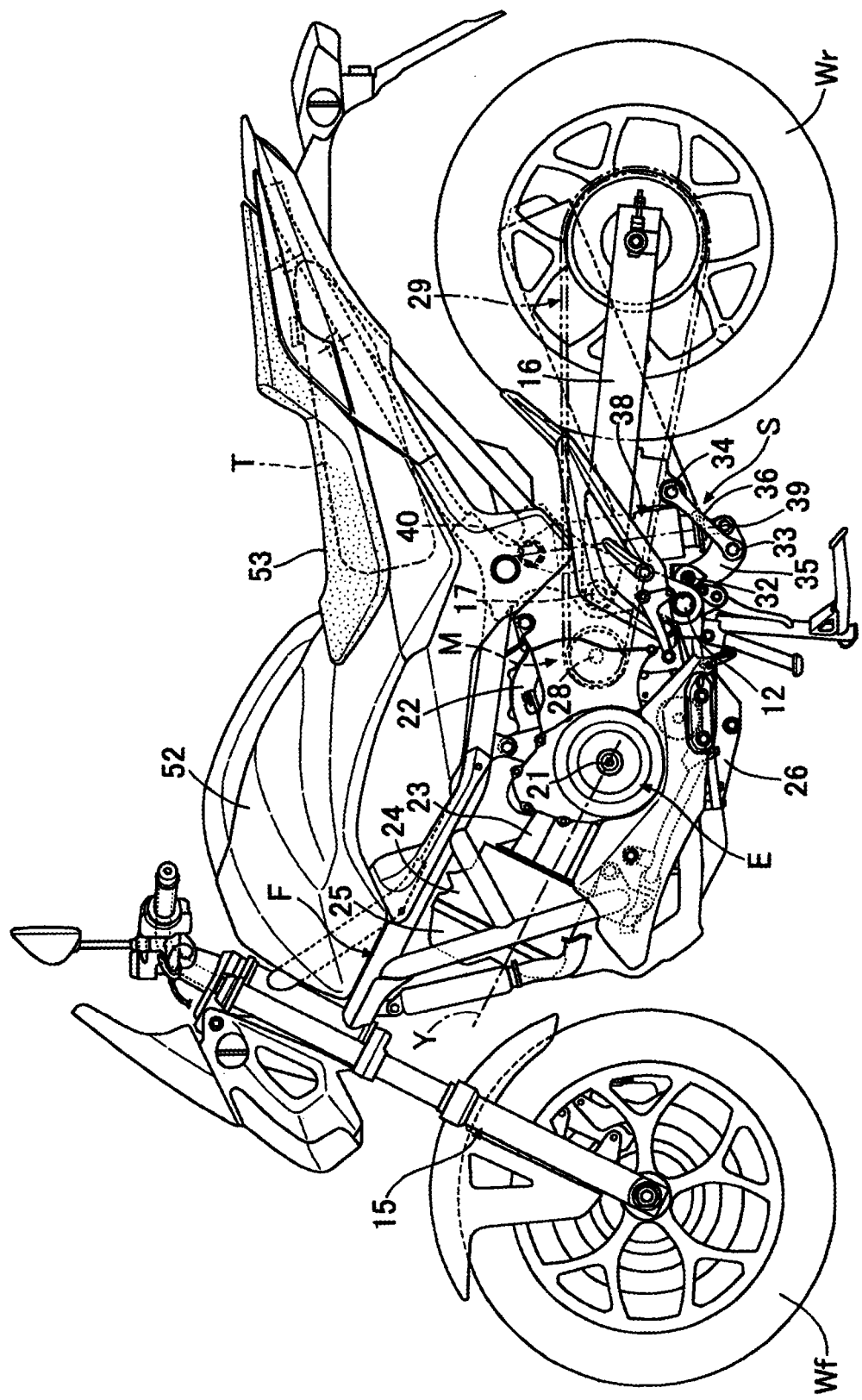
FIG. 1 is a left side elevational view of a motorcycle according to an embodiment of the present invention.
Figure 2:
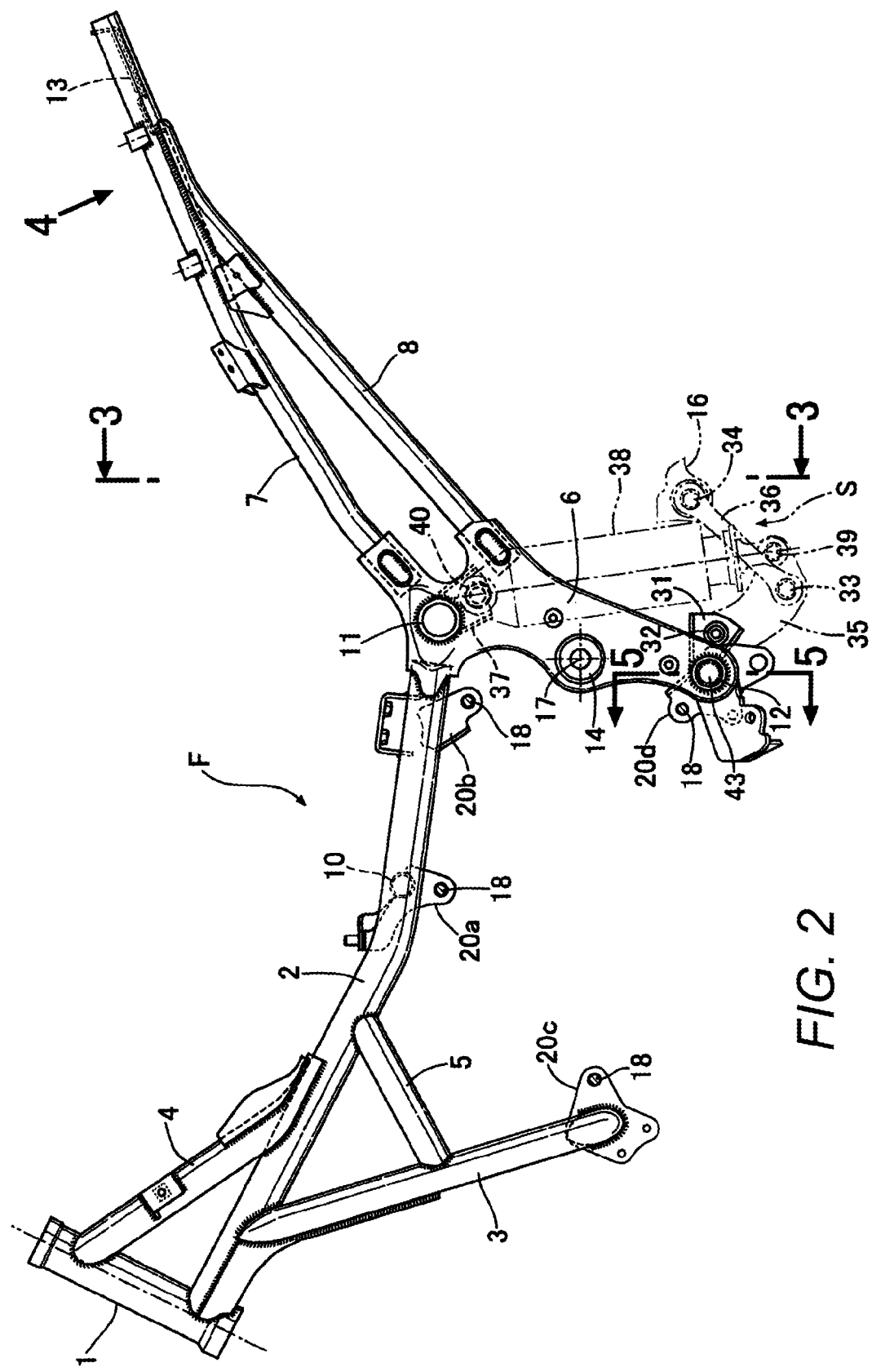
FIG. 2 is an enlarged side elevational view of a vehicle body frame of the motorcycle.
Figure 3:
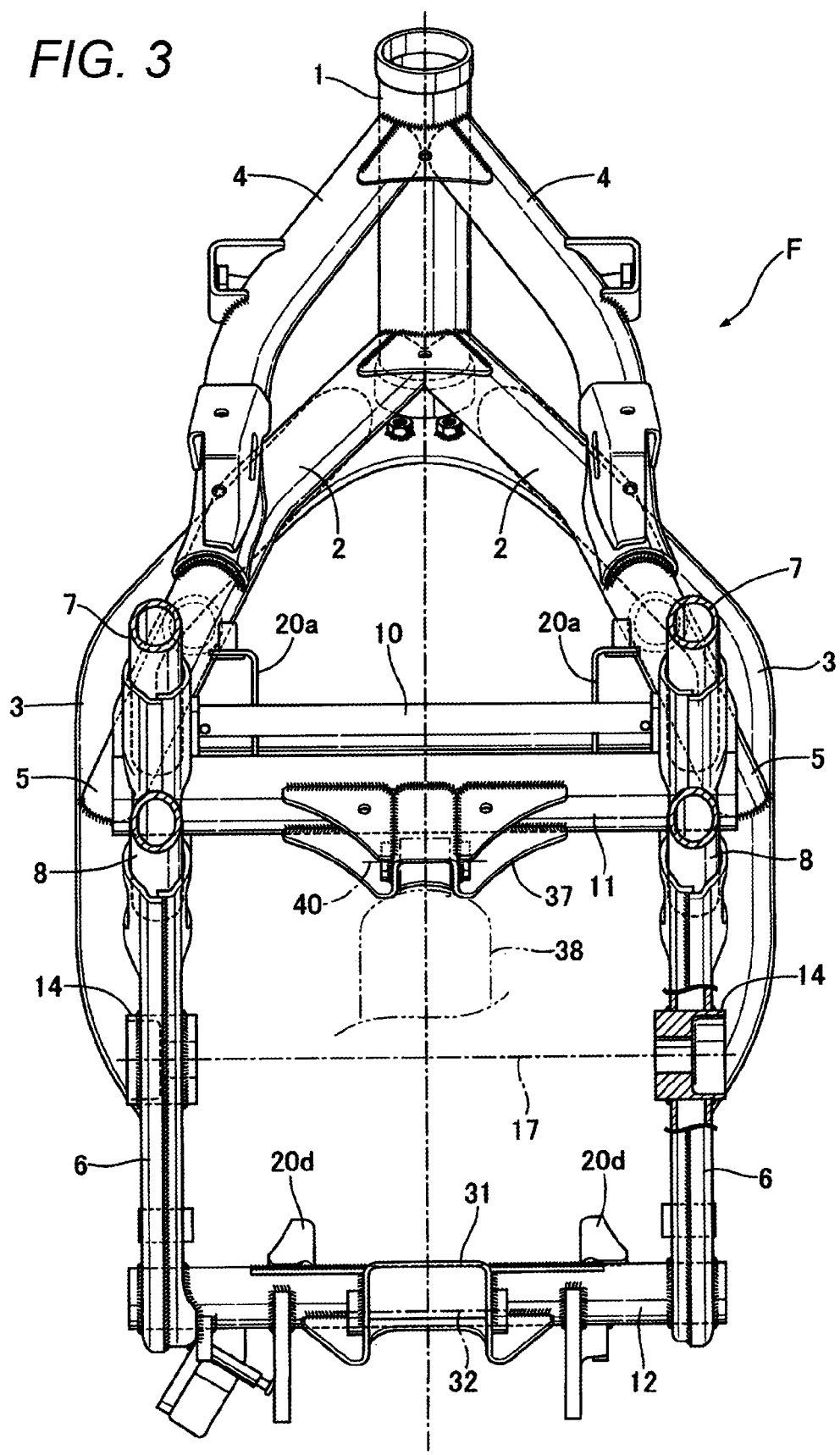
FIG. 3 is a sectional view taken along a line 3-3 of FIG. 2.
Figure 4:
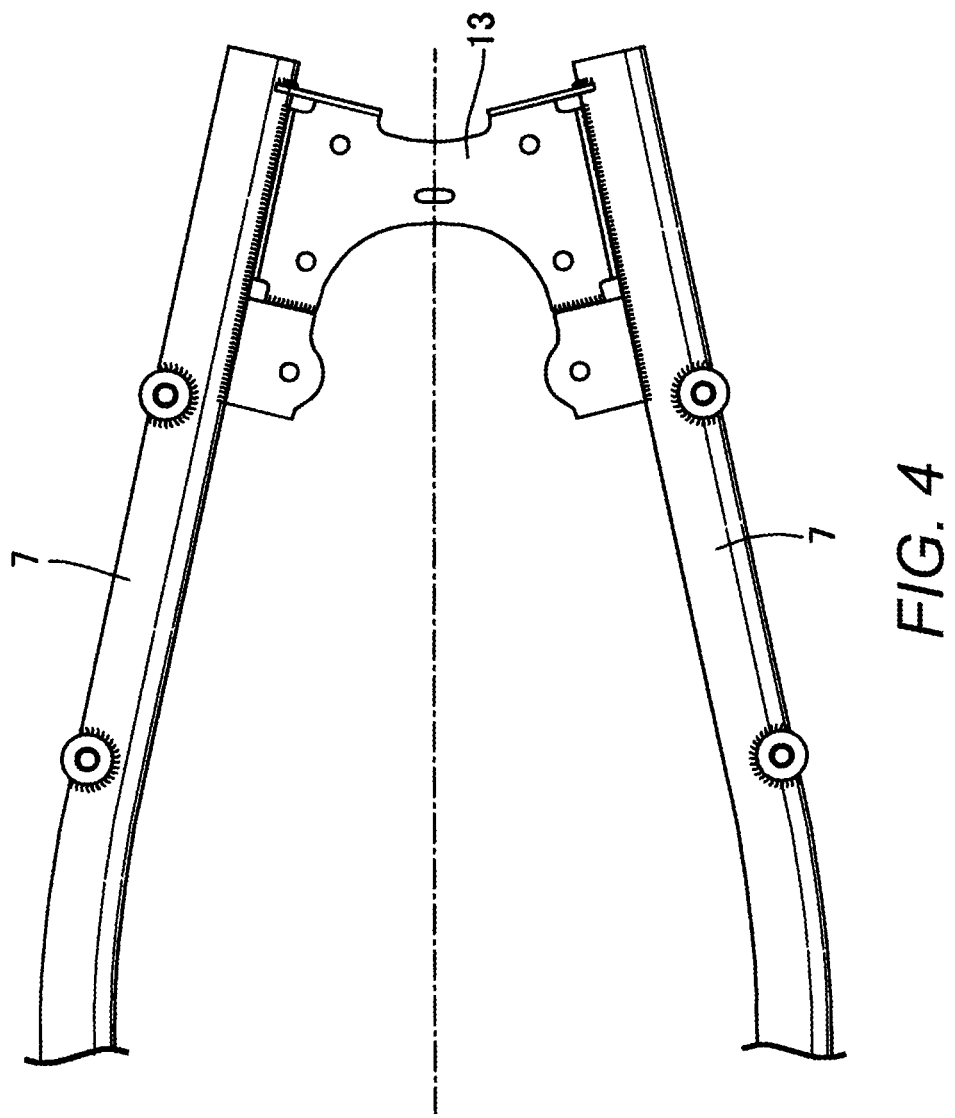
FIG. 4 is a view as indicated by an arrow mark 4 of FIG. 2.

The embodiments will now be described with reference to the accompanying drawings, wherein like reference numerals designate corresponding or identical elements throughout the various drawings.

In the following, a saddle riding vehicle in which the embodiment is applied to a motorcycle is described with reference to the accompanying drawings. It is to be noted that, in the following description, the front, rear, left and right are represented with reference to the motorcycle.

Referring first to FIGS. 1 to 4, a vehicle body frame F of the motorcycle includes: a head pipe 1; a pair of left and right main frames 2, 2 extending downwardly rearwards in a moderate gradient from a lower end portion of the head pipe 1; a pair of left and right down frames 3, 3 extending downwardly in a steep gradient from front end portions of the main frames 2, 2; stays 4, 4 extending from upper end portions of the head pipe 1 and coupled to the main frames 2, 2 rearwardly of the coupling points between the down frames 3, 3 and the main frames 2, 2; stays 5, 5 interconnecting the main frames 2, 2 and the down frames 3, 3 rearwardly of the coupling points between the stays 4, 4 and the main frames 2, 2; a pair of left and right pivot frames 6, 6 extending downwardly from rear ends of the main frames 2, 2; a pair of left and right seat rails 7, 7 extending rearwardly upwards from upper portions of the pivot frames 6, 6; stays 8, 8 for interconnecting an intermediate portion of each pivot frame 6 and a rear portion of each seat rail 7 on the same left or right side; a first cross member 10 for connecting intermediate portions of the left and right main frames 2, 2 to each other; a second cross member 11 for connecting upper end portions of the left and right pivot frames 6, 6 to each other; a third cross member 12 for connecting lower end portions of the pivot frames 6, 6; and a fourth cross member 13 for connecting rear end portions of the left and right seat rails 7, 7. To intermediate portions of the left and right pivot frames 6, 6 in the upward and downward direction, pivot bearing tubes 14, 14 extending through the intermediate portions along the vehicle widthwise direction and arranged coaxially with each other are welded.

On the head pipe 1 described above, a front fork 15 which supports a front wheel Wf for rotation is supported for steering movement, and on the left and right pivot bearing tubes 14, 14, opposite end portions of a pivot shaft 17 which supports a rear fork 16, supporting a rear wheel Wr for rotation thereon, for upward and downward rocking motion are supported.

An engine E is disposed in a region surrounded by the main frames 2, 2, down frames 3, 3 and pivot frames 6, 6, and a plurality of engine hangers 20a to 20d which support the engine E through bolts are secured to the first cross member 10, main frames 2, 2, down frames 3, 3 and third cross member 12, respectively, by welding.

The engine E includes: a crankshaft 21 having an axial line extending in the vehicle widthwise direction; a crankcase 22 for supporting the crankshaft 21; a cylinder block 23 coupled to an upper end of a front portion of the crankcase 22 in such a manner as to have a forwardly inclined cylinder axial line Y; a cylinder head 24 coupled to an upper end of the cylinder block 23; a head cover 25 coupled to an upper end of the cylinder head 24; and an oil pan 26 coupled to a lower portion of the crankcase 22. Further, a transmission M is disposed in the crankcase 22, and a countershaft 28 of the transmission M extends through the left side wall of the crankcase 22 at one end portion thereof and protrudes to the outside. The countershaft 28 is connected at the one end portion thereof to the rear wheel Wr through a chain power transmission apparatus 29 to drive the rear wheel Wr.

Further, a suspension apparatus S for damping upward and downward rocking motion of the rear fork 16 is interposed between the pivot frame 6 and the rear fork 16. This suspension apparatus S is configured from a rocking member 35 supported for upward and downward rocking motion through a first support shaft 32 on a lower cushion bracket 31 secured to the third cross member 12, a tension link 36 connected for rocking motion between an intermediate portion of the lower cushion bracket 31 and the rear fork 16 through second and third support shafts 33 and 34, and a cushion unit or device 38 interposed between an end portion of the rocking member 35 and an upper cushion bracket 37 secured to an intermediate portion of the second cross member 11. The cushion unit 38 is connected at an upper end portion thereof to the upper cushion bracket 37 secured to the intermediate portion of the second cross member 11 through a fourth support shaft 40, and is connected at a lower end portion thereof to an end portion of the rocking member 35 through a fifth support shaft 39.

Figure 5:
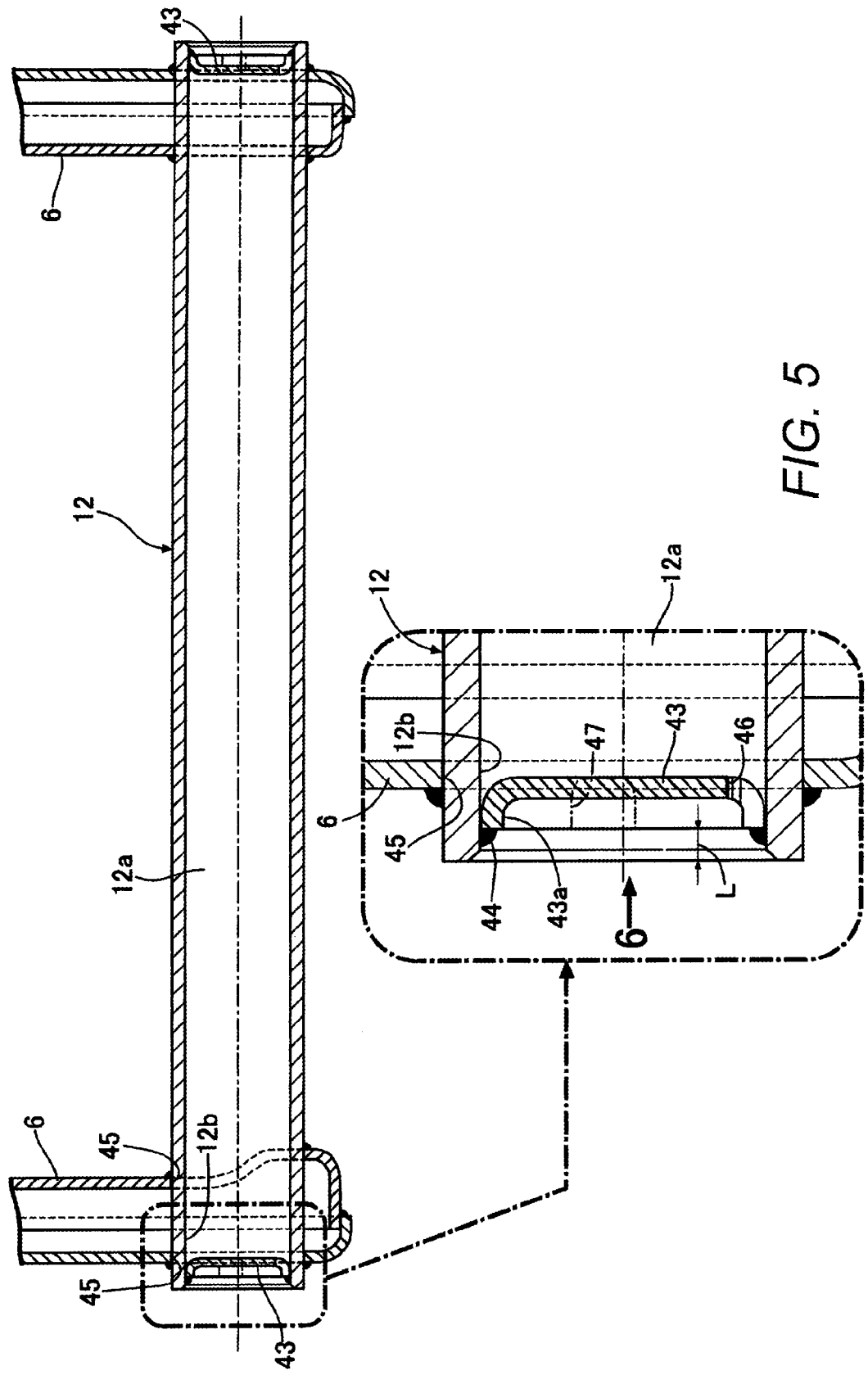
FIG. 5 is an enlarged sectional view taken along a line 5-5 of FIG. 2.
Figure 6:
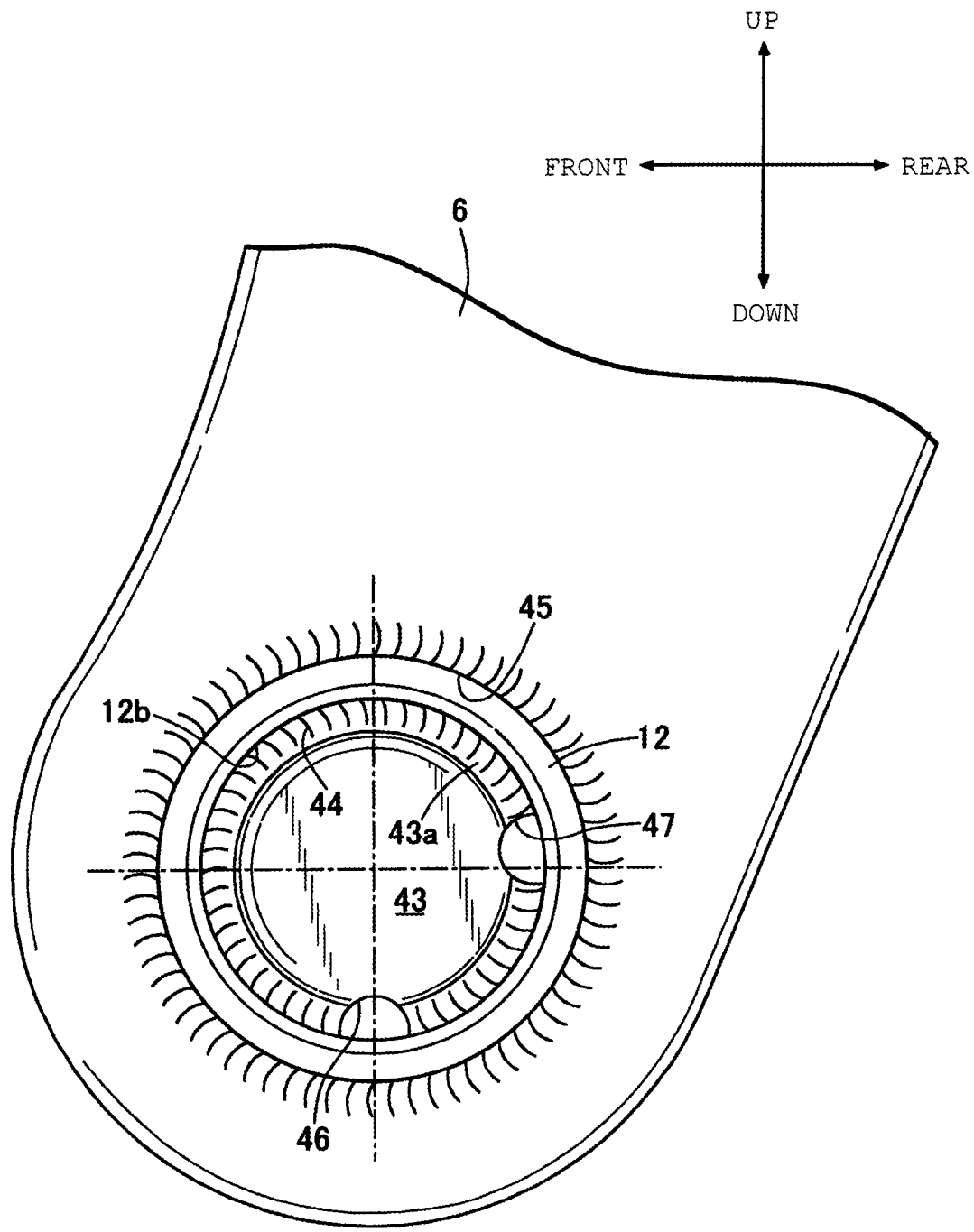
FIG. 6 is an enlarged view as indicated by an arrow mark 6 of FIG. 5.

As shown in FIGS. 5 and 6, the third cross member 12 is configured from a pipe member having a hollow portion 12a which is open at the opposite ends thereof, and a cylindrical portion 43a formed on an outer periphery of a cap-shaped patch member 43 is force fitted in an inner peripheral face 12b in the proximity of each open end of the hollow portion 12a. Thereupon, a predetermined welding margin L which reaches an open end of the hollow portion 12a from the patch member 43 is set to the inner peripheral face 12b of the third cross member 12, and the cylindrical portion 43a is welded to the inner peripheral face 12b in such a manner that weld beads 44 may be included within the range of the welding margin L. Thus, since the patch member 43 force fitted to a fixed position in the inner peripheral face 12b of the third cross member 12 does not move inadvertently during welding, welding at the fixed position to the inner peripheral face 12b can be carried out readily and precisely. Particularly since anything which may interfere with a welding tool does not exist around the sole third cross member 12 before coupling to the pivot frames 6, 6, fitting and welding of the patch member 43 into and to the inner peripheral face 12b of the third cross member 12 can be carried out efficiently.

Thereafter, the third cross member 12 is fitted in connecting holes 45, 45 provided respectively at lower end portions of the pivot frames 6, 6 and arranged coaxially in such a manner as to bridge the left and right pivot frames 6, 6. Thereupon, since the weld beads 44 included within the welding margin L of the inner peripheral face 12b of the third cross member 12 do not appear on the outer face of the third cross member 12, the third cross member 12 can be fitted readily into the connecting holes 45, 45 without being disturbed by the weld beads 44. After the third cross member 12 is fitted, it is welded at the opposite end portions thereof to the outer side faces of the left and right pivot frames 6, 6.

The third cross member 12 having the hollow portion 12a which is open at the opposite ends thereof is reinforced at the opposite end portions thereof effectively by the cap-shaped patch members 43 having high rigidity, and the left and right pivot frames 6, 6 are connected to each other by this reinforced third cross member 12. Consequently, the rigidity of the pivot frames 6, 6 is also reinforced efficiently. Further, since the rocking member 35 which supports the lower end of the cushion unit 38 in the suspension apparatus S is supported for rotation on the lower cushion bracket 31 of the third cross member 12, the third cross member 12 and the pivot frames 6, 6 can sufficiently withstand a high rearward load acting from the cushion unit 38 upon the rocking member 35 and can stabilize working of the suspension apparatus S. Thus, reinforcement of the rigidity of the third cross member 12 formed from a hollow pipe member and enhancement of the productivity of the vehicle body frame F can be achieved simultaneously.

As shown in FIGS. 5 and 6, a first cutaway portion 46 is provided at a lower portion of an outer peripheral face of the patch member 43 while a second cutaway portion 47 is provided at a rear portion of the outer peripheral face of the patch member 43. Both of the first and second cutaway portions 46 and 47 communicate with the inside and the outside of the patch member 43 with each other, and the first cutaway portion 46 plays a role of discharging rain water and so forth admitted in the third cross member 12 to the outside therethrough, thereby preventing the rain water from remaining in the third cross member 12.

Figure 7:
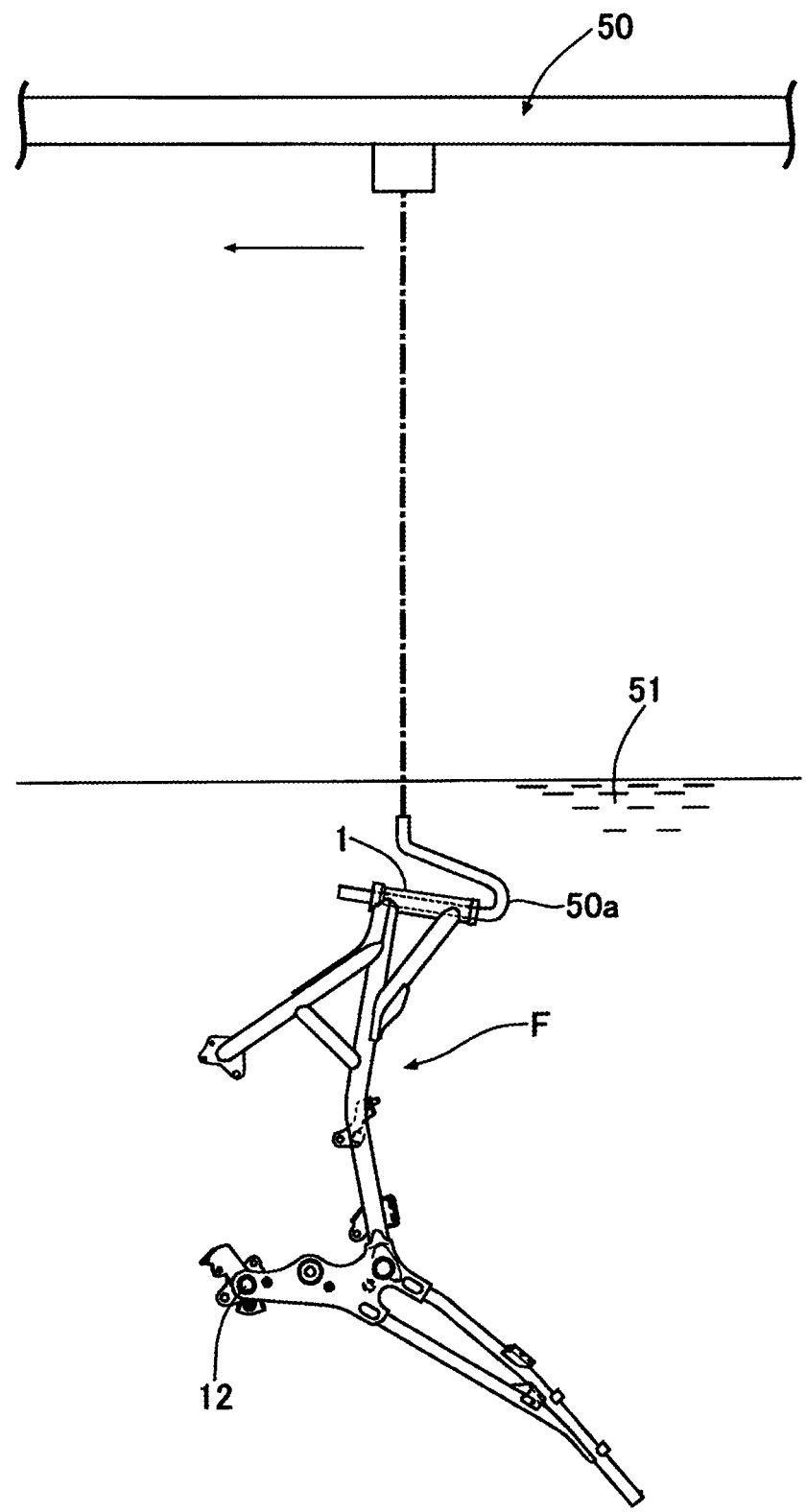
FIG. 7 is an explanatory view of a dip coating state of the vehicle body frame.

Meanwhile, as shown in FIG. 7, upon dip painting of the vehicle body frame F, when a hook 50a of a painting conveyor 50 is fitted in the head pipe 1 to suspend the vehicle body frame F, the second cutaway portion 47 comes to a lower portion of the patch member 43. Accordingly, when the vehicle body frame F is dipped into painting liquid 51, the painting liquid 51 flows into the hollow portion 12a of the third cross member 12 through the second cutaway portion 47 or flows out to the outside from the hollow portion 12a. Consequently, painting of the inner peripheral face 12b of the third cross member 12 can be improved, and surplus painting liquid can be discharged to the outside from within the third cross member 12.

Referring back to FIG. 1, an accommodation box 52 is mounted on the main frames 2, 2 above the engine E, and a rider's seat 53 of the tandem type is attached for opening and closing movement on the seat rails 7, 7 rearwardly of the accommodation box 52. A fuel tank T supported by the seat rails 7, 7 is disposed just below the seat 53.

Although the embodiment of the present invention has been described, the present invention is not limited to the embodiment described above, but various design changes can be carried out without departing from the subject matter of the present invention.

According to an embodiment, a vehicle body frame which includes: a pair of left and right frame members having connecting holes individually extending through the frame members in a vehicle widthwise direction and arranged in a spaced relationship from each other in the vehicle widthwise direction with the connecting holes disposed coaxially; and a cross member fitted in both of the connecting holes in such a manner as to bridge the frame members and coupled by welding to both of the frame members, has a first aspect that the cross member is configured from a pipe member having a hollow portion which is open at the opposite ends thereof, a cap-shaped patch member is fitted in an inner peripheral face in the proximity of each of the open ends of the hollow portion of the cross member, a welding margin connecting to the open end is provided on the inner peripheral face, and the patch member is welded to the inner peripheral face such that weld beads are included within the range of the welding margin. It is to be noted that the cross member corresponds to the third cross member 12 described above.

According to the first aspect of the embodiment, since weld beads which couple the patch member to the inner peripheral face of the cross member are included within the range of the welding margin set to the inner peripheral face, the cross member can be fitted readily into the connecting holes of the frame member without being disturbed by the weld beads. After the insertion, the opposite outer end portions of the cross member which project outwardly from the connecting holes and the left and right frame members can be welded to each other. Besides, since the patch member has a cap shape having high rigidity, the rigidity of the cross member can be reinforced effectively, and accordingly, both of reinforcement in rigidity of the cross member and enhancement of the productivity of the vehicle body frame can be achieved simultaneously.

Further, the embodiment has, in addition to the first aspect, a second aspect that the patch member is force fitted in the inner peripheral face in the proximity of the open end of the hollow portion of the cross member.

According to the second aspect of the embodiment, since the patch member is force fitted in the inner peripheral face in the proximity of the open end of the hollow portion of the cross member, upon welding after the force fitting of the patch member, an unnecessary movement of the patch member can be suppressed without using a special tool. Consequently, the welding can be carried out readily and precisely, which can contribute to enhancement of the efficiency of the welding operation.

Furthermore, the embodiment has, in addition to the first or second aspect, a third aspect that the vehicle body frame includes a head pipe for supporting a front fork, which supports a front wheel for rotation thereon, for steering movement, a main frame extending rearwardly from the head pipe, a pair of left and right pivot frames as the paired frame members extending downwardly from a rear portion of the main frame, and supporting a rear fork, which supports a rear wheel for rotation thereon, for upward and downward rocking motion through a pivot shaft, and the cross member welded to the pivot frames to bridge the pivot frames, and a rocking member for supporting a lower end portion of a cushion unit in a suspension apparatus for damping upward and downward rocking motion of the rear fork is supported for pivotal motion on the cross member.

According to the third aspect of the embodiment, the cross member whose rigidity is reinforced by the patch member is connected to the left and right pivot frames to effectively reinforce also the rigidity of the left and right pivot frames. Consequently, a high load acting from the cushion unit upon the rocking member can be withstood sufficiently and operation of the suspension apparatus can be stabilized.

Furthermore, the embodiment has, in addition to the third aspect, a fourth aspect that a first cutaway portion which communicates the inside and the outside of the patch member with each other for water drainage is provided at a lower portion of an outer peripheral face of the patch member.

According to the fourth aspect of the embodiment, the first cutaway portion plays a role of discharging rain water or the like admitted in the third cross member to the outside therethrough, and the rain water can be prevented from remaining in the cross member.

Furthermore, the embodiment has, in addition to the third aspect, a fifth aspect that a second cutaway portion, which is to communicate between the inside and the outside of the patch member fitted in and welded to the inner peripheral face in the proximity of the open end of the hollow portion of the cross member, for allowing painting fluid to inflow and outflow is provided at a portion which comes to a lower position of the outer peripheral face of the patch member when painting the vehicle body frame.

According to the fifth aspect of the embodiment, the second cutaway portion plays a roll of allowing, when the vehicle body frame is dipped into painting liquid, the painting liquid to flow into the hollow portion of the cross member or flow out to the outside from the hollow portion. Consequently, the painting of the inner peripheral face of the cross member can be carried out well and surplus painting liquid can be discharged from within the cross member to the outside.

Furthermore, according to the embodiment, a production method for the vehicle body frame, which includes: the pair of left and right frame members having the connecting holes individually extending through the frame members in the vehicle widthwise direction and arranged in the spaced relationship from each other in the vehicle widthwise direction with the connecting holes disposed coaxially; and the cross member fitted in both of the connecting holes in such a manner as to bridge the frame members and coupled by welding to both of the frame members, has a sixth aspect that the production method successively executes a step of preparing the cross member configured from a pipe member having the hollow portion which is open at the opposite ends thereof, a step of fitting the cap-shaped patch member into the inner peripheral face in the proximity of each of the open ends of the hollow portion of the cross member, a step of welding the patch members to the inner peripheral face, a step of fitting the cross member into the connecting holes of the frame members, and a step of welding outer end portions of the cross member projecting outward from the connecting holes to outer side faces of the frame members.

According to the sixth aspect of the embodiment, upon production of the vehicle body frame, by successively carrying out fitting and welding the cap-shaped patch member into and to the inner peripheral face of the cross member, fitting, after the welding, the cross member into the connecting holes of the frame members, and welding, after the fitting, the outer end portions of the cross member projecting outward from the connecting holes to the outer side faces of the frame members, the vehicle body frame can be produced efficiently. In particular, since the fitting and welding of the patch member into and to the inner peripheral face of the cross member are carried out before the cross member is fitted into the connecting holes of the frame members, upon such welding, such a problem that a welding tool interferes with the frame member does not arise and the welding operation can be carried out readily. Besides, thereupon, the weld beads formed on the inner peripheral face of the cross member do not protrude to the outer periphery side of the cross member, and therefore, the cross member after welding of the patch members can be fitted into the connecting holes of the frame members. Besides, since the patch member has a cap shape having high rigidity, the rigidity of the cross member can be reinforced efficiently. Accordingly, reinforcement in rigidity of the cross member and enhancement in productivity of the vehicle body frame can be achieved simultaneously.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle body frame comprising:
    a right frame member having a right connecting hole extending through the right frame member in a vehicle widthwise direction;
    a left frame member having a left connecting hole extending through the left frame member in the vehicle widthwise direction, the left frame member being spaced from the right frame member in the vehicle widthwise direction, the left connecting hole being disposed substantially coaxially with the right connecting hole;
    a cross member fitted in both of the left connecting hole and the right connecting hole and welded to the left frame member and the right frame member, the cross member including a pipe member having a hollow portion which has a first end, a second end opposite to the first end along the hollow portion, a first opening at the first end, and a second opening at the second end; and
    a first patch member fitted in the first end of the hollow portion and welded to an inner peripheral face of the hollow portion such that a weld bead is provided within a range of a first welding margin provided in the first end of the hollow portion, the first welding margin being provided on the inner peripheral face of the hollow portion, an axial outer end surface of the first patch member being disposed more to an axial inner side in the hollow portion than an axial outer end surface of the hollow portion, the weld bead being disposed more to the axial inner side in the hollow portion than the axial outer end surface of the hollow portion,
    wherein the hollow portion includes a tapered surface that extends from the axial outer end surface to an inner peripheral surface of the hollow portion, and
    wherein the weld bead is disposed more to the axial inner side in the hollow portion than the tapered surface.

2. The vehicle body frame according to claim 1,
    wherein the first patch member is force-fitted in the first end of the hollow portion.

3. The vehicle body frame according to claim 1,
    wherein the first welding margin comprises a space provided between an axially outer end surface of the first patch member and an axially outer end surface of the first end of the hollow portion.

4. The vehicle body frame according to claim 1, further comprising:
    a second patch member fitted in the second end of the hollow portion, the second patch member being welded to the inner peripheral face of the hollow portion such that a weld bead is provided within a range of a second welding margin provided in the second end of the hollow portion, the second welding margin being provided on the inner peripheral face of the hollow portion.

5. The vehicle body frame according to claim 3,
    wherein the second patch member is force-fitted in the second end of the hollow portion.

6. The vehicle body frame according to claim 3,
    wherein the second welding margin comprises a space provided between an axially outer end surface of the second patch member and an axially outer end surface of the second end of the hollow portion.

7. A saddle riding vehicle comprising:
    a front fork;
    a front wheel rotatably supported by the front fork;
    a rear fork;
    a rear wheel rotatably supported by the rear fork;
    the vehicle body frame according to claim 1, the vehicle body frame further comprising:
        a head pipe supporting the front fork in a rotatable manner; and
        a main frame extending rearwardly from the head pipe, the left and right frame members extending downwardly from a rear portion of the main frame and supporting the rear fork in a rotatable manner for upward and downward rocking motion through a pivot shaft, the cross member being welded to the left and right frame members to connect the left frame member to the right frame member;
    a suspension apparatus to damp upward and downward rocking motion of the rear fork, the suspension apparatus including a cushion device; and
    a rocking member supporting a lower end portion of a cushion device and pivotally supported by the cross member.

8. The saddle riding vehicle according to claim 7,
    wherein the first patch member includes a first cutaway portion connecting an inside space of the cross member with an outside space of the cross member to drain water, the first cutaway portion being provided at a lower portion of an outer peripheral face of the first patch member.

9. The saddle riding vehicle according to claim 7,
    wherein the first patch member includes a second cutaway portion connecting the inside space of the cross member with the outside space of the cross member to allow painting fluid to pass through the second cutaway, the second cutaway portion being provided at a portion provided at a lower position of the outer peripheral face of the patch member when the vehicle body frame is painted.

10. A method for producing a vehicle body frame, the method comprising:
preparing a cross member including a pipe member having a hollow portion which has a first end, a second end opposite to the first end along the hollow portion, a first opening at the first end, and a second opening at the second end;
fitting a first patch member into the first end of the hollow portion of the cross member;
welding the first patch member to an inner peripheral face of the hollow portion such that a weld bead is provided within the first end of the hollow portion;
fitting the cross member into a left connecting hole of a left frame member and a right connecting hole of a right frame member so that the first and second ends of the cross member respectively project outward from the left and right connecting holes;
welding the first end of the cross member to an outer side face of the left frame member; and
welding the second end of the cross member to an outer side face of the right frame member,
wherein an axial outer end surface of the first patch member is disposed more to an axial inner side in the hollow portion than an axial outer end surface of the hollow portion, the weld bead being disposed more to the axial inner side in the hollow portion than the axial outer end surface of the hollow portion,
wherein the hollow portion includes a tapered surface that extends from the axial outer end surface to an inner peripheral surface of the hollow portion, and
wherein the weld bead is disposed more to the axial inner side in the hollow portion than the tapered surface.

11. The method according to claim 10,
wherein, the welding of the first patch member includes welding the first patch member to the inner peripheral face of the hollow portion such that the weld bead is provided within a range of a first welding margin provided in the first end of the hollow portion, the first welding margin being provided on the inner peripheral face of the hollow portion.

12. The method according to claim 10, further comprising:
fitting a second patch member into the second end of the hollow portion of the cross member; and
welding the second patch member to the inner peripheral face of the hollow portion.

13. The method according to claim 12,
wherein, the welding of the second patch member includes welding the second patch member to the inner peripheral face of the hollow portion such that a weld bead is provided within a range of a second welding margin provided in the second end of the hollow portion, the second welding margin being provided on the inner peripheral face of the hollow portion.

* * * * *